(No Model.)

G. N. TODD.
PICKER STEM AND CLEANER.

No. 423,538. Patented Mar. 18, 1890.

Witnesses.

Inventor.
George N Todd
By Jno. G. Elliott
Atty.

UNITED STATES PATENT OFFICE.

GEORGE N. TODD, OF CHICAGO, ILLINOIS, ASSIGNOR TO THE TODD COTTON HARVESTER COMPANY, OF ILLINOIS.

PICKER-STEM AND CLEANER.

SPECIFICATION forming part of Letters Patent No. 423,538, dated March 18, 1890.

Application filed September 14, 1887. Serial No. 249,625. (No model.)

*To all whom it may concern:*

Be it known that I, GEORGE N. TODD, a citizen of the United States, residing in Chicago, county of Cook, and State of Illinois, have invented certain new and useful Improvements in Picker-Stems and Cleaners, of which the following is a specification.

This invention relates to improvements in picker-stems and cleaners in which projecting teeth are formed in series upon small cylinders and disks, constituting picker-stems and cleaner devices for removing the gathered cotton from the stems.

The object of this invention is to produce such devices having picking-teeth provided with concaved shanks, in which the next adjoining tooth shall lie, whereby not only will the points of the teeth be guarded, but a greater number of teeth may be employed than by the prior constructions. I attain this object by devices illustrated in the accompanying drawings, in which—

Figure 1:
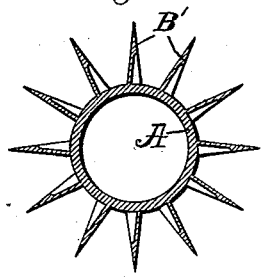
Figure 2:
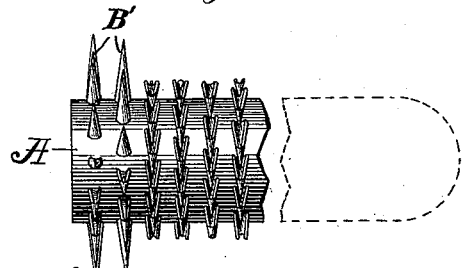
Figure 3:
Figure 6:
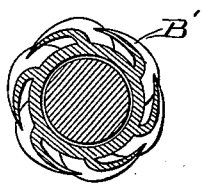
Figure 7:
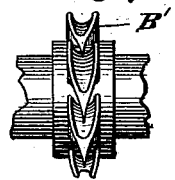
Figure 4:
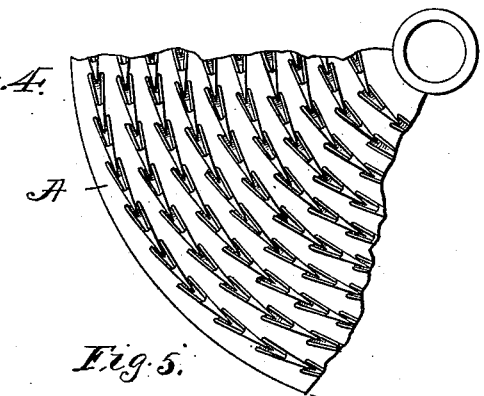
Figure 5:
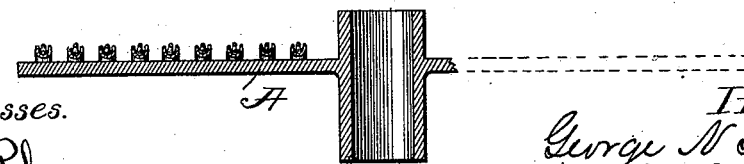

Figure 1 represents a transverse section through a picker-stem embodying my invention, in which the body and the stem are cast in a single blank and the teeth afterward pointed and shaped; Fig. 2, a side elevation of the same, showing some of the teeth bent down into a working position; Fig. 3, a transverse section through a completed stem. Figs. 4 and 5 represent a cleaner formed in the same manner; Figs. 6 and 7, a modified form of picker-stem, showing the teeth cast in ring-like form and sleeved upon a central shaft.

Similar letters of reference indicate the same parts in the several figures of the drawings.

Referring by letter to the accompanying drawings, A indicates the body of the stem or cleaner, having cast thereon and projecting radially or upright therefrom series of teeth B', having concaved shanks—that is to say, having the rear sides thereof concaved toward the base in such manner that when the teeth are bent down into working position the point of each tooth will lie in the concaved shank of the tooth next in front, whereby the points of the teeth will be effectually guarded against the lodgment thereunder of twigs, leaves, and other non-fibrous substances.

Another important advantage results from the overlapping of the teeth that can be employed, thereby materially enhancing the effectiveness of the picking-surface as a whole.

The picking-stems may be constructed in various ways, either by casting in the form of a blank. such as is shown in Figs. 1 to 5, inclusive, with the teeth and body integral, after which the teeth are pointed in any suitable manner and then bent down into their working position, or the teeth may be cast in rings in one or two parts and sleeved upon a central shaft, as shown in Figs. 6 and 7.

Having described my invention, what I claim, and desire to secure by Letters Patent, is—

A picking device for fibrous material, provided with teeth having shanks concaved in cross-section on the back or outer side thereof, in which concavity lie the points of the next teeth to the rear, substantially as described, and for the purpose set forth.

GEORGE N. TODD.

Witnesses:
W. W. ELLIOTT,
WILL R. OMOHUNDRO.